United States Patent [19]

Rossi

[11] 4,249,672
[45] Feb. 10, 1981

[54] COUNTER FOR TICKET-LIKE ITEMS

[76] Inventor: Alfred F. Rossi, 503 Old Woods Rd., Wyckoff, N.J. 07481

[21] Appl. No.: 52,252

[22] Filed: Jun. 26, 1979

Related U.S. Application Data

[63] Continuation of Ser. No. 827,682, Aug. 25, 1977, abandoned.

[51] Int. Cl.³ .............................................. B65G 59/06
[52] U.S. Cl. .................................................... 221/264
[58] Field of Search ...................... 221/7, 271, 272–275, 221/251, 264, 276, 241, 242; 133/4 A; 271/131, 142

[56] References Cited

U.S. PATENT DOCUMENTS 2,250,051   7/1941   Patzer .................................. 133/4 A

*Primary Examiner*—Stanley H. Tollberg

[57] ABSTRACT

A counting slide, with a counting aperture formed therethrough to the configuration of the items to be counted and to a height corresponding to the height of a stack containing the desired number of such items, is disposed in a counting block for reciprocating movement between a receiving position, in alignment with an access aperture formed through a top plate of the block and disposed beneath a supply magazine, and a discharge position, removed therefrom to permit the items so counted to exit the counting block by an exit aperture formed through a bottom plate of such block. The access and exit apertures are not aligned and are formed to the same configuration as the items to be counted. A longitudinal recess in the surface of slide beneath said top plate coacts with a stop block that extends downwardly from beneath said top plate to inhibit the bottom-most item from being dragged from beneath the stack as the slide is returning to its receiving position. A bevel cut is formed in the face wall of said access aperture to facilitate movement of the top-most item on the stack being counted, from beneath the supply stack. An air operated piston actuates the counting slide. A change in count is effected by changing counting blocks to one with a counting aperture of a height corresponding to the height of the number of items in the count. The magazine is disposed for selected vertical adjustment with respect to the counting block.

17 Claims, 6 Drawing Figures

COUNTER FOR TICKET-LIKE ITEMS

This is a continuation, of application Ser. No. 827,682, filed Aug. 25, 1977, abandoned.

BACKGROUND OF THE INVENTION

1. Field of Application

This invention relates to item counters; and more particularly to devices for successfully counting similar numbers of items upon separation thereof from a larger grouping of such items.

2. Description of the Prior Art

It is quite often necessary to package or otherwise collect a number of sets or groups of items; each group or set containing the same count. One obvious way of accomplishing this is by merely hand counting each item, one at a time, until the desired number for the set or group is reached; and then repeating the process until all items are so counted or the desired number of sets or groups is attained. Hand counting, however, is slow and tedious and subject to considerable human error.

Machine counters are available in many forms and configurations. Most such machines are quite complex in configuration and operation and as such costly to manufacture and operate. A good number of such machine counters also effect their counting by counting one item at a time. This is not only subject to error, but requires a cycle time which is different for each different count and which obviously increases in duration as the number of items in the count increases.

One commonly available counter for provided sets or groups of planar ticket-like or tag-like items (such as the machine marked identification tickets utilized in retail stores), requires a rotating wheel with vacuum operated suction heads each of which removes a ticket-like item from a stack of such items disposed in a supply magazine. Such devices are also not error free since they might miss picking up a ticket-like item. In addition the cycle time for compiling a set of a given number, for such devices, extends as the given number of items in the set or group is extended.

SUMMARY OF THE INVENTION

It is therefore an object of this invention to provide a new and improved counter.

It is another object of this invention to provide a new and improved item counter.

It is still another object of this invention to provide a new and improved counter for providing sets or groups of items of a selected given number from a larger supply of such items.

It is yet still another object of this invention to provide a new and improved counter for providing sets, or groups, of items of a selected given number from a large supply of such items wherein the cycle time of the counter remains relatively constant irrespective of the selected number of items in each count.

It is yet still a further object of this invention to provide a new and improved counter for counting relatively thin and planar ticket-like items.

It is yet still another object of this invention to provide a new and improved ticket counter.

This invention involves item counters; and contemplates positioning a counting block beneath a magazine containing a supply of the items to be counted such that the items may pass from the supply magazine through an access aperture of the counting block, disposed in alignment with the supply magazine, and into a counting aperture in a counting slide housed in the counting block for reciprocating movement between an item receiving position, in alignment with said access aperture, and an item discharge position, in alignment with an exit aperture of the counting block. The counting aperture is of a size and configuration to receive the number of items in the selected count; while the access and exit apertures are of a size and configuration to permit passage of the items into and out of the counting block. A change of count is accomplished by merely changing the counting block to one having a counting slide with a counting aperture of appropriate size and configuration, the supply magazine being mounted for adjustable positioning and proper alignment with counting blocks of different heights.

Other objects, features, and advantages of the invention in its details of construction and arrangement of parts will be seen from the above, from the following description of the preferred embodiment when considered with the drawings, and from the appended claims.

DESCRIPTION OF THE PREFERRED EMBODIMENT

For convenience the invention will be described as applied to a counter for counting selected numbers of relatively thin and planar price marking tickets of the type commonly used in the retail trades for consumers items and incorporating a counting block formed from metal and provided with a counting slide also of metal, having formed therethrough a counting aperture of a size and configuration to receive the number of tickets in the count, and reciprocated between ticket receiving and discharge positions by an air-operated piston. It being understood, nevertheless, that without departing from the scope of the invention; that the counting block or any of its parts, may be formed of plastic or other suitable material; that the counting slide may be reciprocated by any suitable means, including electrically operated solenoids, and that the items to be counted may be of any configuration as long as the counting aperture is formed to a size and configuration corresponding thereto and to the number of such items in the count.

Figure 1:
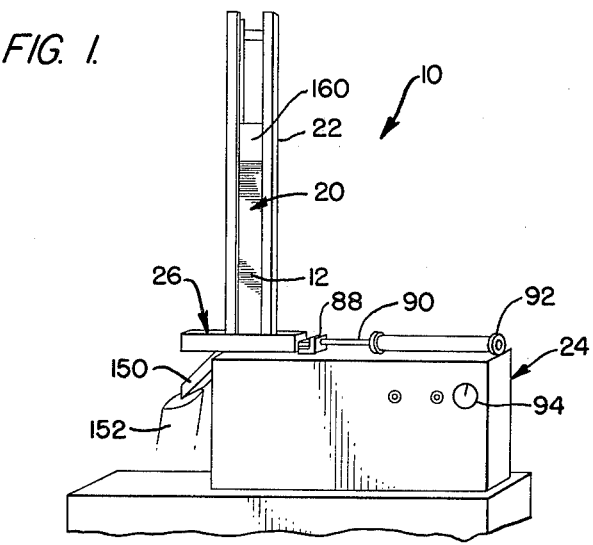
FIG. 1 is a perspective showing of an item counter incorporating the instant invention.
Figure 2:
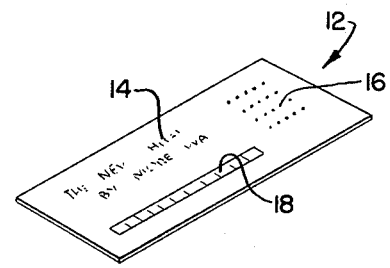
FIG. 2 is a perspective showing of a relatively thin and planar ticket-like item that can be counted by the counter of FIG. 1.
Figure 3:
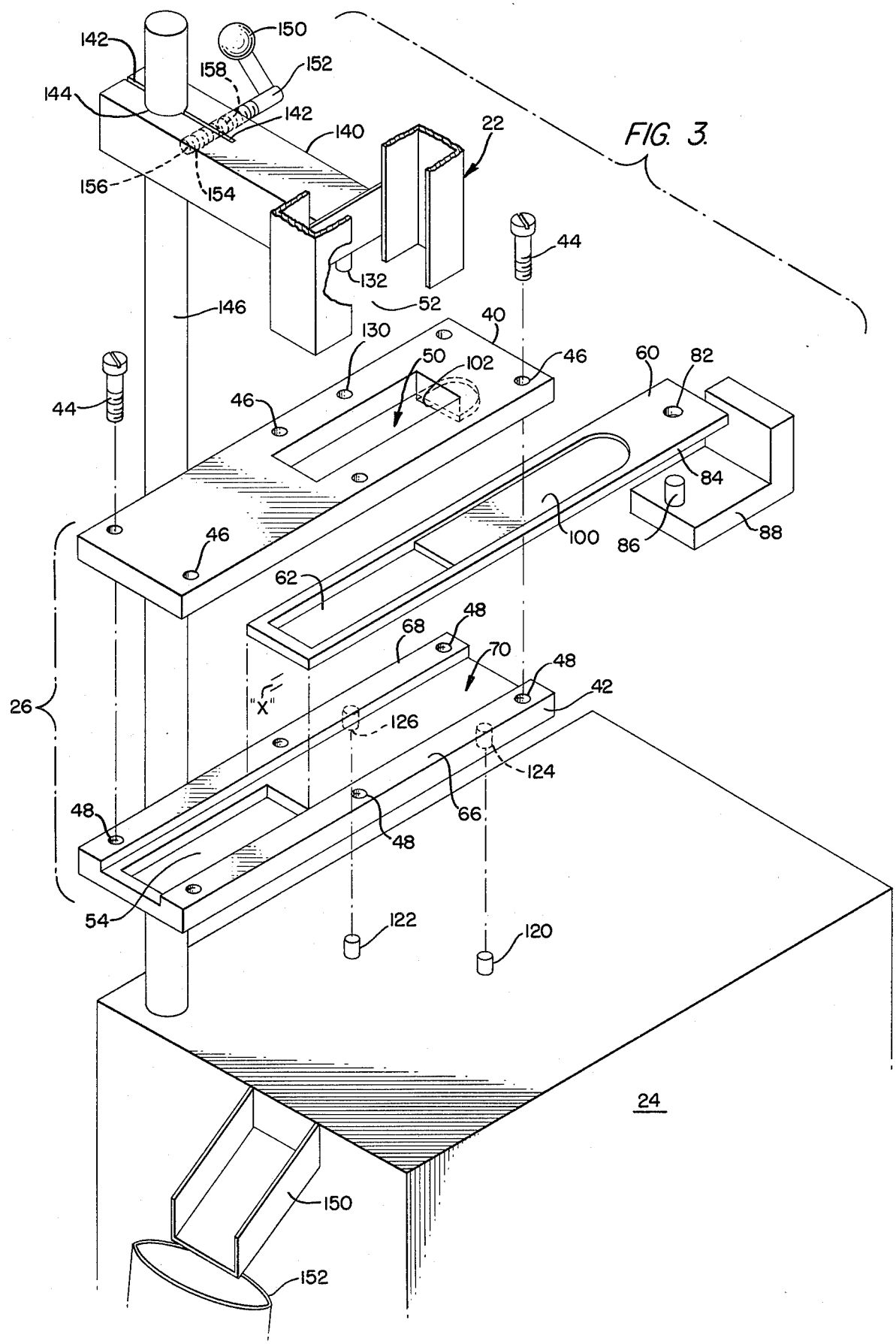
FIG. 3 is an enlarged perspective showing of the counting block and its support mounting of the counter of FIG. 1, with the counting block exploded to better show the details thereof.

With reference to FIG. 1, there is generally shown at 10 an item counter for relatively thin planar ticket-like items 12 (FIG. 2); such as price marking tickets for retail and similar trades, and wherein such ticket may show printed information 14 as well as machine sensible information such as perforations 16 or magnetic or optical markings 18. A supply of tickets 12, is disposed in a stack 20 in a supply magazine 22 (FIGS. 1 and 3) disposed for selective vertical adjustment, as will be hereinafter described, upon a counter base 24 and with respect to a counting block 26 also positioned upon base 24 as will be hereinafter described.

Figure 4:
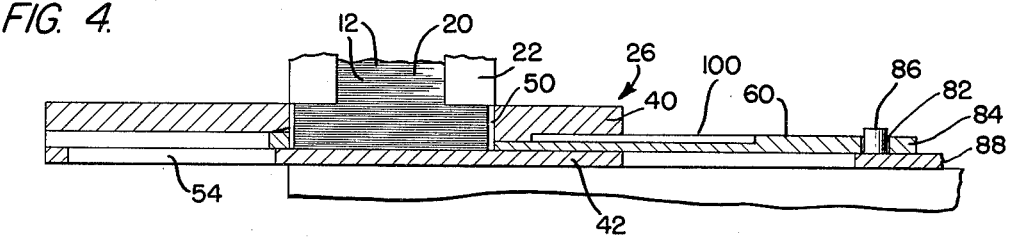
FIG. 4 is an elevational sectional view of a portion of the counting block showing the counting slide thereof in item receiving position aligned with the supply of items in an item magazine.
Figure 5:
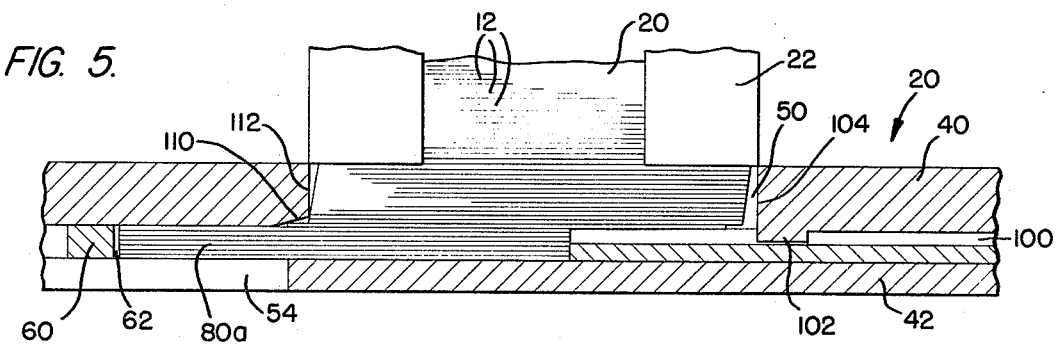
FIG. 5 is an elevational sectional view of a portion of the counting block shown in FIG. 4, showing the counting slide advancing from its item receiving position towards its item discharge position, and enlarged to better show details thereof.
Figure 6:
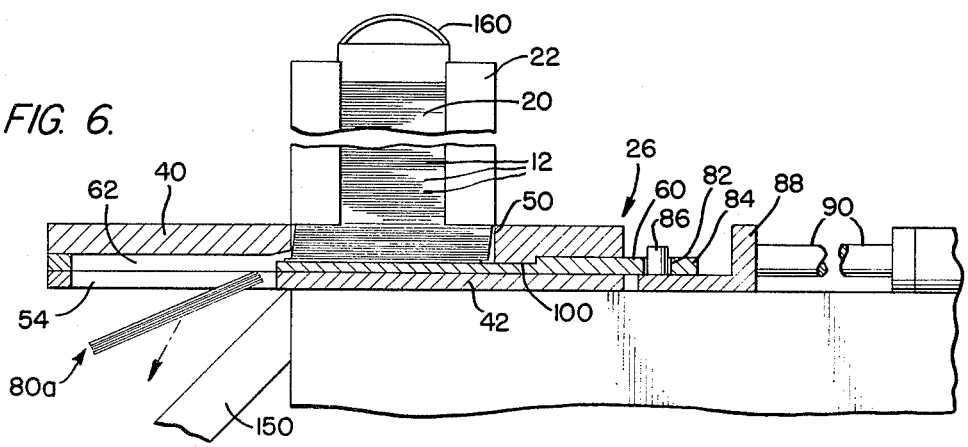
FIG. 6 is an elevational sectional view of the counting block of FIGS. 4 and 5, showing the counting slide in item discharge position and a set of items of selected count being discharged.

Counting block 26 is formed of a suitable metal such as steel or stainless steel; but may just as well be formed, in whole or in part, of a suitable plastic such as Delrin or the like. Block 26 includes a top plate 40 and a bottom plate 42 secured together by a number of threaded members 44 (FIG. 3) which pass through suitable holes 46 formed through top plate 40, and are threaded into internally threaded holes 48 formed in bottom plate 42. An access aperture 50 is formed through top plate 40 in a position for alignment with a discharge opening 52 at the bottom of supply magazine 22; and of a size and configuration to allow items, such as tickets 12, to freely drop from supply magazine 22 into access aperture 50 (FIGS. 4-6). An exit aperture 54 is formed through bottom plate 42 so as to be offset or out of alignment with access aperture 50 along a predetermined item discharge path to be hereinafter described; but so as to be of a size and configuration to allow items, such as tickets 12, to be discharged from counting block 26 after being counted.

A counting slide 60, formed with a counting aperture 62 is housed in counting block 26 between top plate 40 and bottom plate 42 for reciprocating movement along said predetermined item discharge path between a ticket receiving position (FIG. 4) with its counting aperture 62 in alignment with access aperture 50 and a ticket discharge position (FIG. 6) with its counting aperture 62 in alignment with exit aperture 54. A pair of longitudinally extending shoulders 66, 68 are formed on bottom plate 42 to define a longitudinally extending groove 70 within which counter slide 60 reciprocates. Counting aperture 62 is formed to a size and configuration to accommodate the items to be counted and to a height or thickness to provide a volume of space within counting aperture 62 corresponding to the number of items to be counted. In this particular instance the planar configuration of counting aperture 62 corresponds to the planar configuration of tickets 12; while the height or thickness "x" (FIG. 3) of counting aperture 62 corresponds to the height or thickness of a stack of tickets 12 containing the selected count, such as stack 80a (FIGS. 5 and 6). A pin hole 82, formed through an extension 84 of counting slide 60 that extends out from counting block 26, is disposed to receive a pin 86 of an actuating block 88 disposed at the end of a piston rod 90 of an air actuated piston and cylinder assembly 92 fixedly disposed atop base 24. Air from a suitable supply source is supplied to assembly 92 in conventional manner, and suitable controls are provided within base 24 to either selectively operate piston and cylinder assembly 92 to reciprocate counter slide 60 or to operate same in a continuous fashion. A selectively settable counter 94 with suitable controls may be provided within base 24 to automatically arrest continuous operation of assembly 92 when a selected number of sets of tickets has been counted.

A longitudinally extending recess 100 is formed in the top of counter slide 60 for co-operation with a stop block 102 (FIG. 5) which depends downwardly from the underside of top plate 40 in alignment with the backwall 104 of access aperture 50. The configuration of stop block 102 and recess 100, and their positioning, is such that up the return stroke of counter slide 60 (i.e. upon movement thereof from ticket discharge position of FIG. 6, to ticket receiving position of FIG. 4), the tendency of counter slide 60 to drag the bottom-most ticket 12 of stack 20 along with it (due to the friction between the bottom surface of such ticket 12 and the top of slide 60) is offset by such ticket striking stop block 102. Thus such bottom-most ticket 12 is not dragged between the bottom of top plate 40 and the top of counting slide 60 and the counters operation is not arrested due to any such jamming action.

A bevel cut 110 (FIG. 5) is formed at the bottom edge of a front wall 112 of access aperture 50 to permit the uppermost ticket 12 of the counted stack of tickets 80a to be easily moved along with counter slide 60 beneath the undersurface of top plate 40 and not to be jammed therebetween upon movement of counter slide 60 to its ticket discharge position.

Suitable pins 120 and 122 (FIG. 3) extend upwardly from base 24 to be received in pin holes 124, 126 respectively formed in the undersurface of bottom plate 42 of counting block 26 to facilitate proper positioning and insure proper alignment of counting block 26 upon base 24. A pin hole 130 is formed in the upper surface of top plate 50 to receive a pin 132, extending downwardly from a mounting support 140 for supply magazine 22 to insure proper alignment of discharge opening 52 of supply magazine 22 with access opening 50 of counting block 26.

Mounting support 140 is formed from a block of suitable material such as metal and with a slit 142 extending therethrough and through a mounting aperture 144 sized to receive and slide upon a mounting rod 146, fixedly secured to, and extending upwardly from base 24. A locking handle 150 extends from and operates a lock rod 152 having an externally threaded end 154 threadably received within internal threads 156 formed in an opening 158 suitably formed in mounting block 140.

It is important to note that in sizing access aperture 50, counting aperture 62, and exit aperture 54, with respect to each other; that the length and width of aperture 62 are slightly larger then the corresponding dimensions of aperture 50, and that the length and width of aperture 54 are slightly larger then the corresponding dimensions of aperture 62. Thus when apertures 50 and 62 or apertures 62 and 54 are aligned there is no tendency of items to hang up within block 26.

While locating pins 120,122 and 132 have been described as being located on base 24 and support 140 respectively for co-operation with holes 124, 126, and 130 provided in block 26; it should be understood that, if desired, either all or some of said pins 124, 126, and 132 may be located on block 26, and in that case the corresponding holes 124, 126, and 130 would be located on base 24 or support 140.

To change the count of the items to be counted one only has to substitute a counting block with a counting slide having a counting aperture of a size and configuration corresponding to the desired count for counting block 26. In doing so, handle 150 is turned to loosen mounting block 140 on support rod 146. Mounting block 140 and supply magazine 22 are then raised up; and if desired secured in such raised position by turning handle 150 to tighten mounting block 140 in place on support rod 146. Counting block 26 is then lifted off of locating pins 120, 122 and off of pin 86 of piston-cylinder assembly 88. A new appropriately sized counting block is then substituted for block 26 by aligning pin holes 124, 126 thereof with locating pins 120, 122 and by setting pin hole 82 of counting slide 82 over pin 86 of piston-cylinder assembly 92. Handle 150 is again turned to loosen mounting block 140 on support rod 146; and mounting block 140 and supply magazine 22 are slid downwardly on support rod 146 until locating pin 132 of mounting block 140 seats in pin hole 130 in counting block 26. This aligns discharge opening 52 of supply magazine 22 with access opening 50 of counting block 26.

If automatic operation is desired, the selected number of sets of tickets can be set into set counter 94 and automatic operation started by starting operation of piston-cylinder assembly 92. Counter slide 60 will thereafter be reciprocated from its ticket receiving position (FIG. 4) to its ticket discharge position. Upon each such reciprocation the bottom-most set 80a of tickets, in selected number, will be sliced or otherwise separated from stack 20 and moved into alignment with exit aperture 54 of counting block 26. When so disposed the set 80a of tickets 12 will fall by gravity. They can thereafter either fall upon a ticket chute 150 (FIGS. 1, 3 and 6) and be guided thereby into a container 152 (FIGS. 1 and 3) or they may be so discharged directly into container 152.

Container 152 can either be a plastic or paper bag or a box of suitable size. It can be hand held in position beneath chute 150 or for that matter directly beneath exit aperture 54; or it can be held in such position by suitable holding means (not shown). If desired one may merely grab ticket set 80a as it is discharged and secure them in a set by a string or rubber band; or suitable and automatic means may be provided to automatically receive and package ticket set 80a in continuously formed plastic bags or other suitable containers.

A weight 160 may be set upon ticket magazine to insure proper movement of stack 120 down into counting block 26. Alternatively other forms of supply magazines may be disposed with their discharge openings in alignment with the access aperture into counting block 26. The size and configuration of the magazine being dependent upon the size and configuration of the items being counted; it being understood that this invention may just as easily be used to count items of any given size and configuration.

From the above description it will thus be seen that there has been provided a novel and improved counting device for counting off sets of selected numbers of items from a supply containing a number of items larger then said selected number; which counting device is relatively simple in construction and operation, utilizes an item counter which operates on a uniform cycle time irrespective of the selected number of items, in each set, and is easily changed to change the number of items in the sets.

It is understood that although I have shown the preferred form of my invention that various modifications may be made in the details thereof without departing from the spirit as comprehended by the following claims:

I claim:
1. An item counting assembly, comprising;
(a) support means;
(b) item counting means carried by said support means;
(c) item supply means for receiving a supply of items to be counted and for directing same towards said item counting means;
(d) supply mounting means coacting with said item supply means to position same with respect to said item counting means so that items, when stored in said item supply means, are directed to said item counting means;
(e) said item counting means, including:
 (i) first passage means disposed for communication with said item supply means to receive items therefrom and direct same into said item counting means;
 (ii) second passage means for directing items out of said item counting means;
 (iii) said first passage means and said second passage means being disposed in said item counting means so as to be offset one with respect to the other along a predetermined item discharge path;
 (iv) an item counter, having an item receiver of predetermined configuration and which is sized to receive a selected number of items;
 (v) said item counter being disposed in said item counting means for movement along said predetermined item discharge path between an item receiving position, wherein said item receiver is aligned with said first passage means to receive items from the supply means therethrough, and an item discharge position, wherein said item receiver is aligned with said second passage and any items in said item receiver are discharged therethrough; and
(f) operating means disposed for coaction with said item counter to move same between said item receiving position and said item discharge position.

2. The item counting assembly of claim 1; wherein said item counting means is carried by said support means so as to be readily interchanged with another item counting means having an item receiver sized to receive a different number of items to thus vary the number of items in the count.

3. The item counting assembly of claim 2; wherein;
(a) said item counting means is in the form of a counting block, with;
 (i) said first passage means formed through first wall means;
 (ii) said second passage means formed through second wall means;
 (iii) said first wall means and said second wall means being normally secured against relative movement one with respect to the other;
(b) said supply mounting means is selectively adjustable to position said supply means in a plurality of selected positions; and
(c) alignment means are provided to align said counting block and supply mounting means.

4. The item counting assembly of claim 3 wherein said alignment means includes aperture means and pin means sized to fit within said aperture means.

5. The item counting assembly of claim 4 wherein said aperture means are formed in respective surfaces of said counting block and said pin means are carried by said supply mounting means and said support means respectively.

6. The item counting assembly of claim 5, wherein said operating means includes an air-operated piston.

7. The item counting assembly of claim 5, wherein said supply mounting means is selectively adjustable to position said supply means in a plurality of selected positions to accomodate different size counter blocks.

8. The item counting assembly of claim 3; wherein:
(a) said first wall means of said counting block includes a first surface and said item counter includes a first surface;
(b) said first surface of said first wall means and said first surface of said item counter being disposed one adjacent the other;
(c) said first passage means, as it merges with said first surface of said first wall means, includes a leading edge and a trailing edge;
(d) said item receiver as it merges with said first surface of said item counter includes a leading edge and a trailing edge;
(e) said first surface of said item counter having formed therein a recess extending from said trailing edge of said item receiver for a predetermined distance; and
(f) a stop block, extending out from said first surface of said first wall means and disposed proximate said trailing edge of said first passage means, and sized to ride in said recess.

9. The item counting assembly of claim 8, wherein said leading edge of said first passage means is bevelled as it merges into said first surface of said first wall means.

10. The item counting assembly of claim 9, wherein said item receiver is slightly larger than said first passage means and said second passage means is slightly larger than said item receiver to facilitate movement of items through said counting means.

11. The item counting assembly of claim 2 wherein said supply means is of a size and configuration to receive a stack of relatively thin planar ticket-like items; and said item receiver is of a configuration and size to receive a selected number of said relatively thin planar ticket-like items.

12. The item counting assembly of claim 11, wherein said items to be counted are price marking tickets.

13. An item counting block for disposition, as an interconnected block, in operative relationship with, and for removal as an interconnected block, from operative relationship with, an item counting machine having support means for mounting the item counting block, and item supply means for receiving items to be counted and directing same towards said item counting block; said item counting block comprising:
(a) first wall means;
(b) second wall means disposed in spaced relationship with respect to said first wall means;
(c) said first wall means and second wall means being normally secured against relative movement one with respect to the other;
(d) an access aperture formed through said first wall means to a size and configuration to allow items of selected size and configuration from the item supply means to pass therethrough and into the item counting block;
(e) an exit aperture formed through said second wall means to a size and configuration to allow the items of the selected size and configuration to pass therethrough and out from the item counting block;
(f) said access aperture and exit aperture being offset one with respect to the other along a predetermined item discharge path;
(g) an item counter, disposed in said space between said first wall means and said second wall means, having formed therethrough a counting aperture of a configuration and size to receive a selected number of items, and movable along said predetermined item discharge path between an item receiving position wherein said counting aperture is aligned with said access aperture to receive said selected number of items after passing therethrough, and an item discharge position wherein said counting aperture is aligned with said exit aperture so that items so counted may be discharged from the item counting block;
(h) said first wall means, said second wall means, and said item counter comprising separate plate elements being assembled together for insertion into operative relationship with, and for removal from operative relationship with, an item counting machine; and
(i) positioning means carried by said item counting block to facilitate disposition thereof in operative relationship with said item counting machine.

14. The item counting block of claim 13, wherein said item counter reciprocates along said predetermined item discharge path between said item receiving position and said item discharge position.

15. The item counting block of claim 14 wherein:
(a) said first wall means includes a first surface and said item counter includes a first surface;
(b) said first surface of said first wall means and said first surface of said item counter being disposed one adjacent the other;
(c) said access aperture, as it merges with said first surface of said first wall means, includes a leading edge and a trailing edge;
(d) said counting aperture, as it merges with said first surface of said first wall of said item counter includes a leading edge and a trailing edge;
(e) said first surface of said item counter having formed therein a recess extending from said trailing edge of said counting aperture for a predetermined distance; and
(f) a stop block extending out from said first surface of said first wall means and disposed proximate said trailing edge of said access aperture, and sized to ride in said recess.

16. The item counting block of claim 15, wherein said leading edge of said access aperture is bevelled as it merges into said first surface of said first wall means.

17. The item counting block of claim 16, wherein said counting aperture is slightly larger than said access aperture and said exit aperture is slightly larger than said counting aperture to facilitate movement of items through said counting device.

* * * * *